United States Patent [19]

Brown

[11] Patent Number: 5,144,807
[45] Date of Patent: Sep. 8, 1992

[54] VAPOR TREATMENT FACILITIES FOR PETROLEUM STORAGE TANK CLEANING

[76] Inventor: Ernest D. Brown, 8001 Cheshire Cir., La Palma, Calif. 90623

[21] Appl. No.: 702,045

[22] Filed: May 17, 1991

Related U.S. Application Data

[63] Continuation-in-part of Ser. No. 474,514, Feb. 2, 1990, Pat. No. 5,017,240.

[51] Int. Cl.⁵ .............................................. F25J 3/00
[52] U.S. Cl. ......................................... 62/20; 55/62
[58] Field of Search ................. 62/17, 20, 48.2; 55/62

[56] References Cited

U.S. PATENT DOCUMENTS

| | | | |
|---|---|---|---|
| 3,266,262 | 8/1966 | Moragne | 62/48.1 |
| 4,331,456 | 5/1982 | Schwartz et al. | 55/26 |
| 4,878,931 | 11/1989 | Grant | 62/17 |

FOREIGN PATENT DOCUMENTS

2098874 12/1982 United Kingdom .

*Primary Examiner*—Ronald C. Capossela
*Attorney, Agent, or Firm*—Plante, Strauss, Vanderburgh

[57] ABSTRACT

There is disclosed a method for the removal and recovery of hydrocarbons which are contained within the air/vapor mixture in bulk oil or gasoline storage tanks using fractional condensation with cryogenic cooling. The air/vapor mixture is flushed from the tank with fresh air and passed, successively, through several stages of a portable condenser train. When necessary, the first stage of the treatment comprises a caustic wash stage where the air/vapor mixture is contacted completely with a caustic solution to remove sulfur compounds. The desulfurized air/vapor mixture is then passed to the first condenser stage which condenses and removes substantially all moisture within the mixture. The de-humidified, desulfurized mixture is then passed to an intermediate stage where the heavier hydrocarbon fractions are condensed and separated and is then passed to a final condenser stage where it is cooled to a temperature of at least −100 degrees F., sufficient to condense substantially all hydrocarbon components therein. The cooling is accomplished cryogenically with direct or indirect heat exchange in each of the condenser stages, using liquid nitrogen. The treated air from the final condenser can be recycled as a source of the air to flush the bulk oil or gasoline storage tank. The system is initially charged with a solvent such as isopropanol, and the condensates are collected in the solvent and become increasingly concentrated in the solvent. The solvent/condensate mixture is continuously recirculated to the condensing stages as a source of wash liquid therein to remove any solids that may form in the condensing stages.

11 Claims, 5 Drawing Sheets

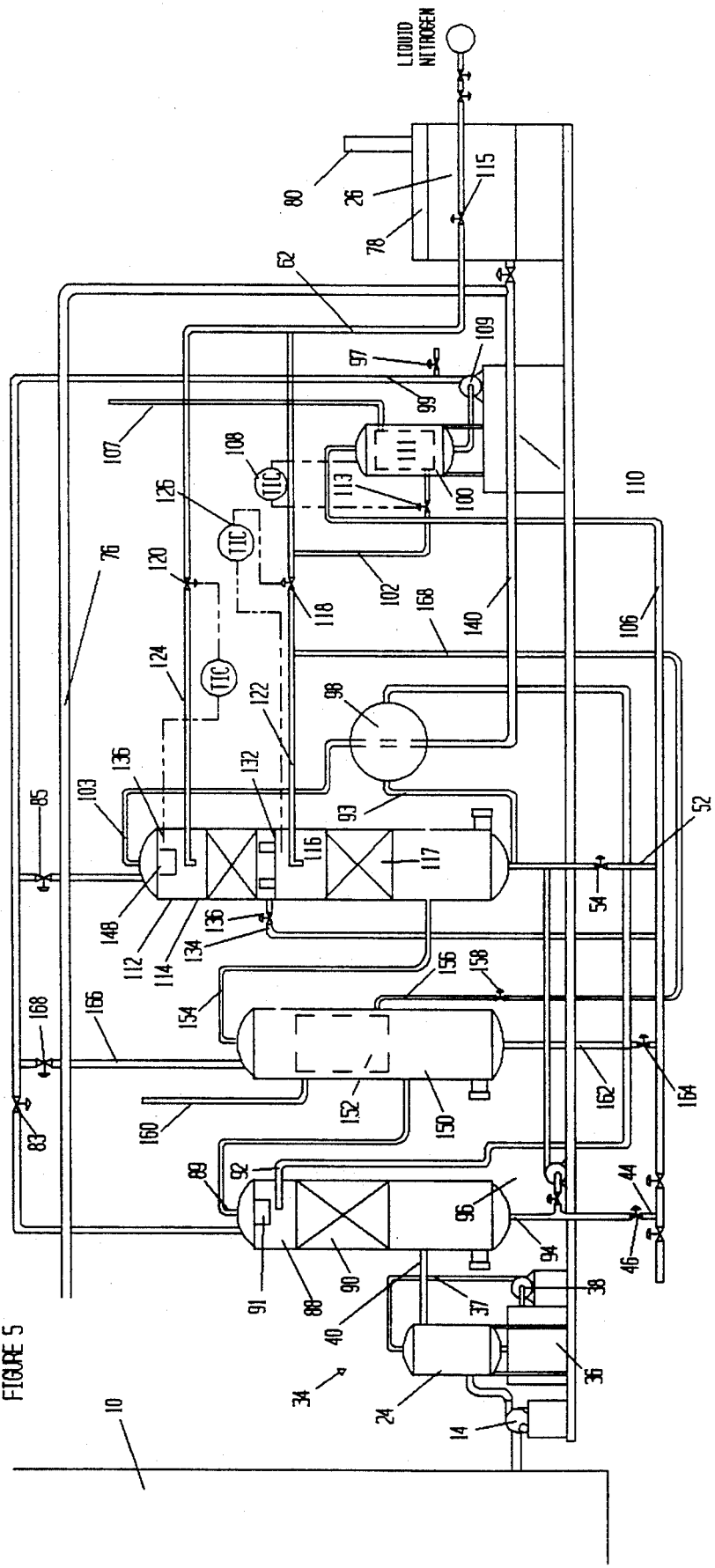

VAPOR TREATMENT FACILITIES FOR PETROLEUM STORAGE TANK CLEANING

RELATIONSHIP TO OTHER APPLICATIONS

This application is a continuation-in-part of my parent application, Ser. No. 474,514, filed on Feb. 2, 1990, now U.S. Pat. No. 5,017,240.

BACKGROUND OF THE INVENTION

1. Field of the Invention

This invention relates to vapor treatment facilities and, in particular, to the application of such facilities in cleaning of petroleum storage tanks.

2. Brief Statement of the Prior Art

Petroleum and its volatile products are stored at bulk terminals, refineries and the like in floating or fixed roof tanks. In floating roof storage tanks, the tank roof floats on the liquid contained within the tank, thereby greatly reducing the volume of vapor over the liquid in the tank. Although these tanks minimize the volume of vapors which are discharged to the atmosphere during normal operations, substantial quantities of vapors are discharged to the environment when the tank is completely emptied, as the floating roof descends to a minimum height which is approximately 6 feet above the bottom of the tank. The tanks are cleaned periodically, and it is necessary to flush the mixture of air and hydrocarbon gases within the tank with fresh air, until the hydrocarbon content of the mixture is sufficiently low to permit workmen to enter the tank for cleaning operations.

During storage of volatile petroleum distillate products such as gasoline, the mixture or air and gasoline vapors within the tank can contain up to about 35 percent hydrocarbons. Additionally, unrefined petroleum crude products such as untreated sour hydrocarbons, can contain sulfur compounds such as mercaptans, hydrogen sulphide, sulfur dioxide and the like. The discharge of the hydrocarbons or the sulfur compounds into the atmosphere during flushing of the tanks is of increasing environmental concern. In some areas of the country, notably Southern California, existing or threatened legislation will prohibit the discharge of this vapor/air mixture directly into the atmosphere.

Various refrigeration units have been proposed to recover vapors from underground gasoline storage tanks at gasoline service stations, or other low volume sources of hydrocarbons, prior to filling of these tanks. These tanks, however, are very small in comparison to the large bulk storage tanks at oil terminals and refineries, and the prior units are far undersized for use in treating the air/vapor mixture from a bulk oil storage tank. Additionally, service station sites are readily accessible and have electrical power supplies which accommodate a portable refrigeration unit, conditions which are seldom present at bulk petroleum storage tank sites.

OBJECTIVES OF THE INVENTION

It is an object of this invention to provide a treatment facility for recovery of the hydrocarbon from the air/vapor mixture present in bulk oil storage tanks prior to cleaning of the tanks.

It is a further object of this invention to provide a condenser train which can be used to recover up to 90% or greater of the hydrocarbons contained within the vapor space of a bulk storage tank used for petroleum distillates.

It is a further object of this invention to provide a condenser train which has facilities for the removal of objectionable impurities such as sulfur compounds from air and hydrocarbon mixtures.

It is also an object of this invention to provide a condenser train utilizing cryogenic cooling, thereby eliminating requirements for on site compressor and power generation units necessary for traditional refrigeration systems.

It is also a further object of this invention to provide a condenser train which will provide cooling of the air/vapor mixture within a petroleum storage tank to temperatures of $-100$ degree F., or lower.

It is a further object of this invention to provide a highly portable and self contained system for recovering hydrocarbons from air mixtures which can be taken to remote locations such as tank farms.

It is also an additional object of this invention to provide a highly portable and self contained system for recovering hydrocarbons from air mixtures which can be used for underground petroleum product storage tanks.

Other and related objects will apparent from the following description of the invention.

BRIEF DESCRIPTION OF THE INVENTION

This invention comprises a method for the removal and recovery of hydrocarbons which are contained within the air/vapor mixture in bulk oil or gasoline storage tanks. In the invention, the air/vapor mixture is flushed from the tank with fresh air and passed, successively, through several stages of a condenser train which is cryogenically cooled. When necessary, the first stage of the treatment comprises a caustic wash stage where the air/vapor mixture is contacted completely with a caustic solution to remove sulfur compounds. The desulfurized air/vapor mixture is then passed to the first condenser stage which condenses and removes substantially all moisture within the mixture. The de-humidified, desulfurized mixture is then passed to an intermediate stage where the heavier hydrocarbon fractions are condensed and separated and is then passed to a final condenser stage where it is cooled to a temperature of at least $-100$ degrees F., sufficient to condense substantially all hydrocarbon components therein. The cooling is accomplished cryogenically with direct or indirect heat exchange in each of the condenser stages, using liquid nitrogen, and the condensation stages are washed of solids by the circulation of a solvent rich reflux liquid in which the condensed hydrocarbons become concentrated during the treatment. This solvent wash additionally aids in mass transfer from the vapor phase to the liquid phase by the scrubbing action of the solvent on the vapor-rich incoming air stream. The treated air from the final condenser can be recycled as a source of the air to flush the bulk oil or gasoline storage tank.

BRIEF DESCRIPTION OF THE DRAWINGS

The invention will be described relative to the figures of which:

FIG. 5 illustrates a modification of the application shown in FIG. 4.

DESCRIPTION OF THE PREFERRED EMBODIMENT

Figure 1:
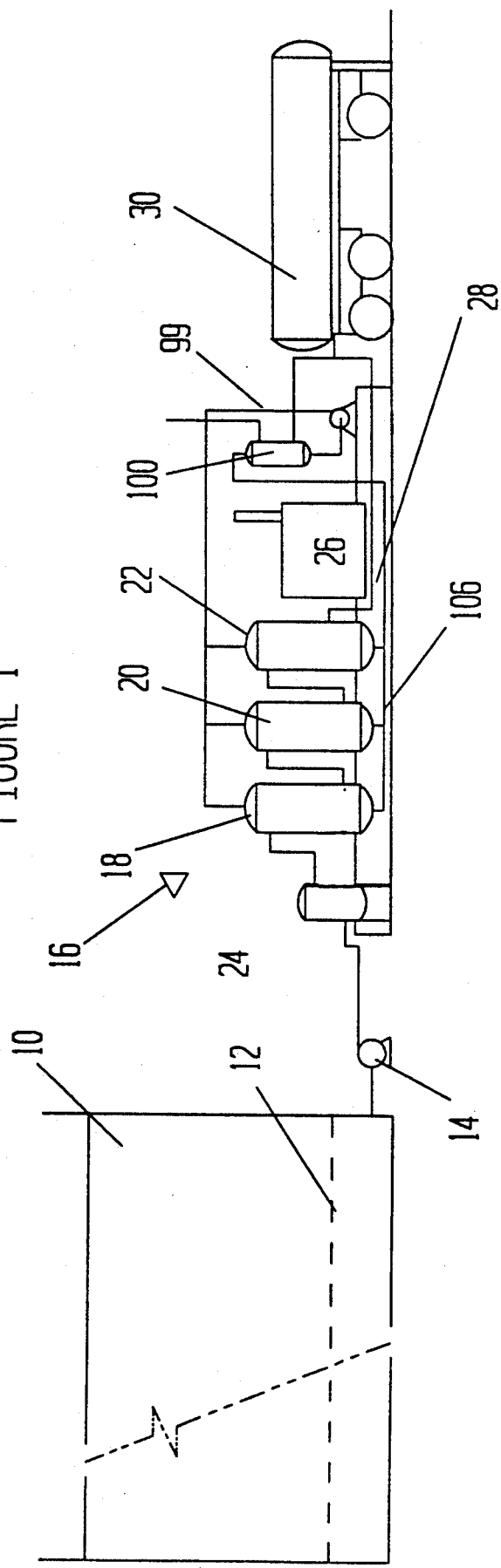
FIG. 1 illustrates a typical application of the invention using indirect cryogenic cooling.

Referring now to FIG. 1, the invention is illustrated as applied to the a typical petroleum distillate bulk storage tank 10. Commonly these tanks have diameters from 50 to 150 feet, usually about 75 feet. When used for storage of volatile products such as gasoline, the tanks also have a floating roof 12 which floats or rests on the level of liquid contained within the tank. The floating roof descends to a minimum height of 6 feet in the storage tank, and when the tank is emptied of liquid, it will contain a residual volume 14 of a air/vapor mixture corresponding to the 6 foot high interior chamber within the tank. The volume of air/vapor mixtures which must be vented and treated from such tanks is from 18,000 to about 50,000 cubic feet.

The air and vapor mixture contained within this residual tank volume must be thoroughly flushed and replaced with fresh air before workmen can enter the tank during cleaning operations. Heretofore, this has been accomplished by blowing fresh air into the tank while exhausting the tank to the atmosphere. Usually from two to about ten volumes of fresh air per volume of air/vapor mixture within the tank must be introduced as flushing air into the tank before the level of hydrocarbons in the vapor space of the tank is at a sufficiently safe level for workmen. Accordingly, the total volume of air/vapor which must be passed to the treatment facilities of the invention is from 30,000 to 500,000 cubic feet, depending on the exact tank volume and the volumes of fresh air that must be used.

The air/vapor discharged from the tank is treated by the treatment facility 16 of the invention which is illustrated to the right of the tank 10 in FIG. 1. The treatment facility 16 comprises a blower 14, several condenser vessels 18, 20 and 22, a caustic wash vessel 24, a solid absorbent treatment vessel 26, and a solvent/condensate vessel 100. Preferably, the facilities include a recycle line 99 from vessel 100 to circulate the solvent and collected condensate to the condenser vessels in sufficient quantities to wash solids from these vessels. The circulation of solvent through the condenser vessels further enhances the mass transfer between the vapor and liquid phases in the condenser vessels.

Preferably the vessels are all mounted on a portable unit such as on a skid 28 or on a wheeled vehicle that permits location of the facility immediately adjacent to the tank 10 which is destined for cleaning.

FIG. 1 also illustrates a storage tank (or trailer) 30 of liquid nitrogen for the cryogenic operation of the train of condensation stages, and for cooling of the solvent/condensate vessel 100. Typically, the treatment of the vapors in conventional bulk storage tanks will require a supply from 1500 to about 5000 gallons of liquid nitrogen, and this amount can be supplied readily to any location using conventional truck/trailer transportation.

Figure 2:
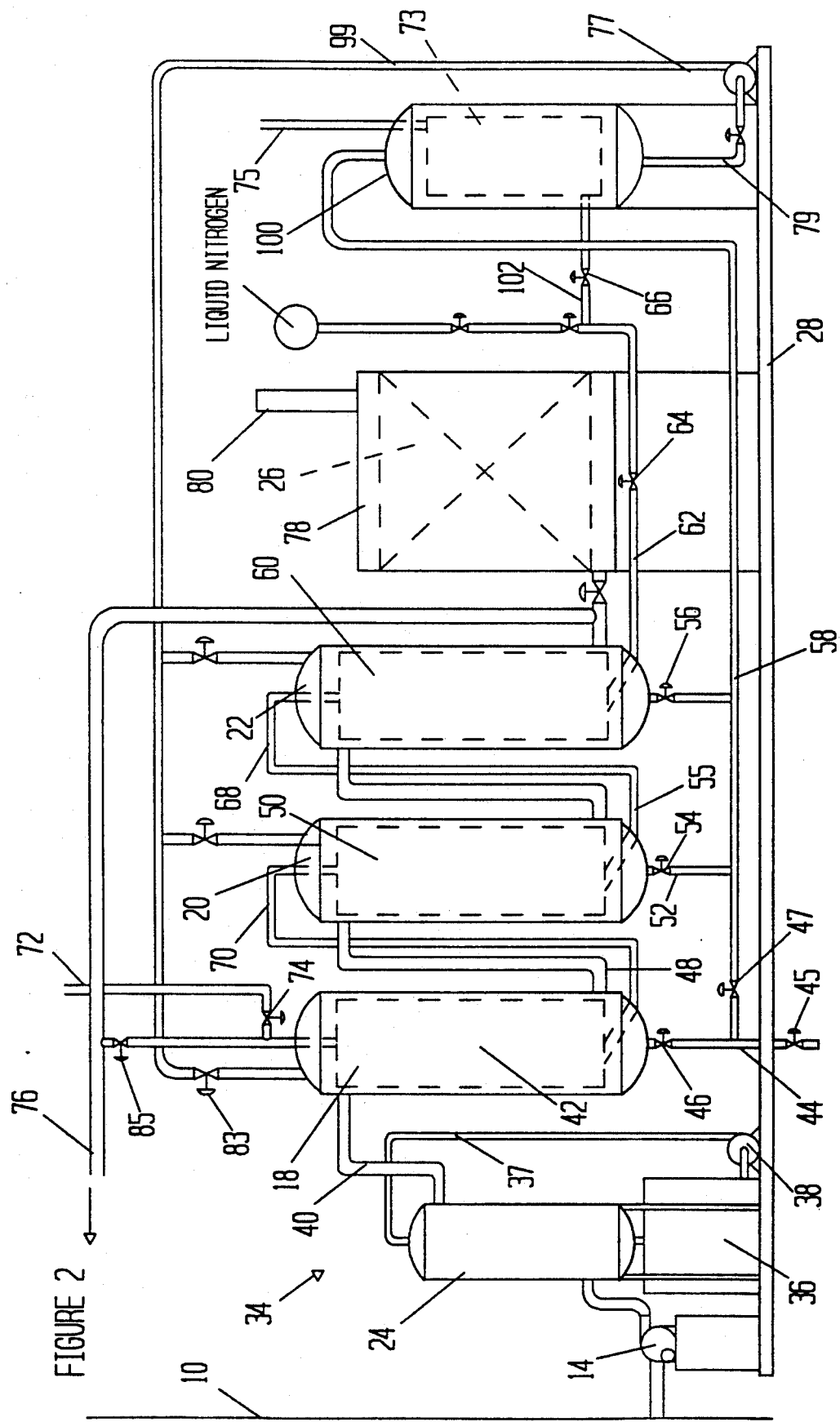
FIG. 2 is an enlarged view of the vapor treatment facilities used in the application shown in FIG. 1.

Referring now to FIG. 2, the treatment facility is illustrated in greater detail. As there illustrated, the bulk storage tank is evacuated with a conventional blower 14 having a capacity from 1000 to about 5000 cubic feet per minute and the air/vapor mixture is discharged into the first stage 34 of the treatment facility. This stage employs a caustic wash treatment in vessel 24 in which the air/vapor mixture is passed counter-current to a spray of caustic, typically aqueous solutions of about 30 weight percent sodium hydroxide. This treatment is practiced to remove the sulfur compounds in the air/vapor mixture such as mercaptans, hydrogen sulphate, sulfur dioxide and the like. The caustic solution is effective in removing the sulfur compounds which remain dissolved in the liquid and accumulate in the caustic wash tank 36. A liquid pump 38 removes the solution from the tank 36 and recycles it to a spray nozzle in the upper region of the vessel 34 through line 37.

The treated vapors are then passed through line 40 to the first condenser vessel 18 where they are passed in indirect heat exchange with a cryogenic cooling fluid. The vapors are passed over the external surfaces of an indirect heat exchange tube bundle 42 represented by the hidden object lines within the condenser vessel 18. Each of the tube bundles in the stages of the condenser train has a surface area of about 900 square feet.

The first stage of condensation is operated with sufficient cooling to reduce the temperature of the air/vapor mixture to approximately 40 degrees F., sufficient to condense substantially all moisture within the air/vapor mixture. The moisture accumulates on the heat exchange surfaces and drains to the bottom of the condenser vessel 18 and is removed therefrom through line 44 as controlled by flow control valve 46. When the condensate in vessel 18 is essentially water, it can be discharged through line 47. In some instances, the condensate will contain a substantial amount of condensed hydrocarbons, and in those instances, the condensate is discharged into the condensate header 49 which discharges into the solvent/condensate vessel 100. In this application, it is preferred to introduce a solvent and condensate mixture from tank 100 into the upper portion of vessel 18 to wash any solids which may be formed therein from the internal baffles or walls of vessel 18. For this purpose, pump 77 recirculates the solvent and condensate mixture from vessel 100 through line 99 and valve 83 to vessel 18. The mass transfer between the vapor and liquid phases in the condenser vessel 18 is enhanced by the countercurrent contacting between the solvent and condensate mixture and the vapor-rich air mixture.

The air/vapor mixture is then passed through conduit 48 to condenser vessel 20, which is the first hydrocarbon condensation stage. This stage is operated with sufficient cooling to reduce the temperature of the air/vapor mixture to about −40 degrees F., sufficient to condense the heavier hydrocarbon fractions within the air/vapor mixture. The heavier hydrocarbons condense on the external surfaces of the indirect heat exchange tube bundle 50 within vessel 20 and drain to the bottom of the vessel from where they are discharged into the condensate header 49 through line 52 as controlled by flow control valve 54.

The vapors which have been reduced in hydrocarbon content are then removed from the condenser vessel 20 and are passed through line 55 to the final condenser vessel 22, where the mixture is cooled to a temperature of −100 degrees F., or less. This cooling is sufficient to condense substantially all the hydrocarbon content of the air/vapor mixture. The condensed hydrocarbons condense on the external surfaces of the tube bundle 60 and drain to the bottom of the condenser vessel 22, from where they are discharged into the condensate header 49 through line 56 at a flow rate which is controlled by valve 58.

The indirect heat exchanger bundles 42, 50 and 60 of the condenser train are supplied with a cryogenic liquid, preferably liquid nitrogen, through supply line 62. The liquid nitrogen is expanded through valves 64 and 66 and directed into the tubes of the first indirect heat exchange bundle 60. The nitrogen is then passed through line 68 to the heat exchange tubes of the heat exchange bundle 50 in the intermediate condenser vessel 20, from where it is passed through line 70 into the tube bundle 42 of the first condenser vessel 18.

The nitrogen can then be vented through line 72 to the atmosphere as controlled by valve 74. Alternatively, the nitrogen can be introduced to the bulk petroleum storage tank 10 as a source of the flush gas therein by discharging it into the air recycle line 76.

The treated air removed from the final condenser vessel 22 can be passed to a final treatment in adsorbent vessel 26, where it contacts a solid adsorbent 78. This last stage is optional, depending on the application, and the prevailing air quality standards. Preferably, the majority of the treated air is recycled to the bulk petroleum storage tank through line 76 as a supply of flush air. The air which is exhausted from the treatment facility through the exhaust stack 80 has received a final purification by the direct contact with a solid adsorbent 78 which is present as a bed of granular solid within the treatment zone 26. Various solids can be used for this purpose, preferably activated charcoal is used, however other solids such as silica gel, molecular sieves, etc. can also be used for this purpose.

Preferably the condensate is passed through header 49 into the solvent/condensate vessel 100. This vessel can contain a heat exchanger 73 which is supplied with liquid nitrogen that is expanded through valve 66, and which is vented from the exchanger 73 through vent line 75. The vessel 100 is initially supplied with a low boiling point solvent for hydrocarbons, and during the treatment it becomes increasingly concentrated with the condensate from vessels 50 and 60, and in some instances, vessel 18. The solvent and condensate mixture is continuously circulated to the upper portions of vessels 50 and 60 by pump 77 through line 99 and control valves 83, 85 and 87. The rate of recirculation is adjusted to wash any solids which may form from the condensation vessels, and to provide optimum mass transfer conditions between the vapor-rich air mixture and the solvent and condensate liquid phase.

Figure 3:
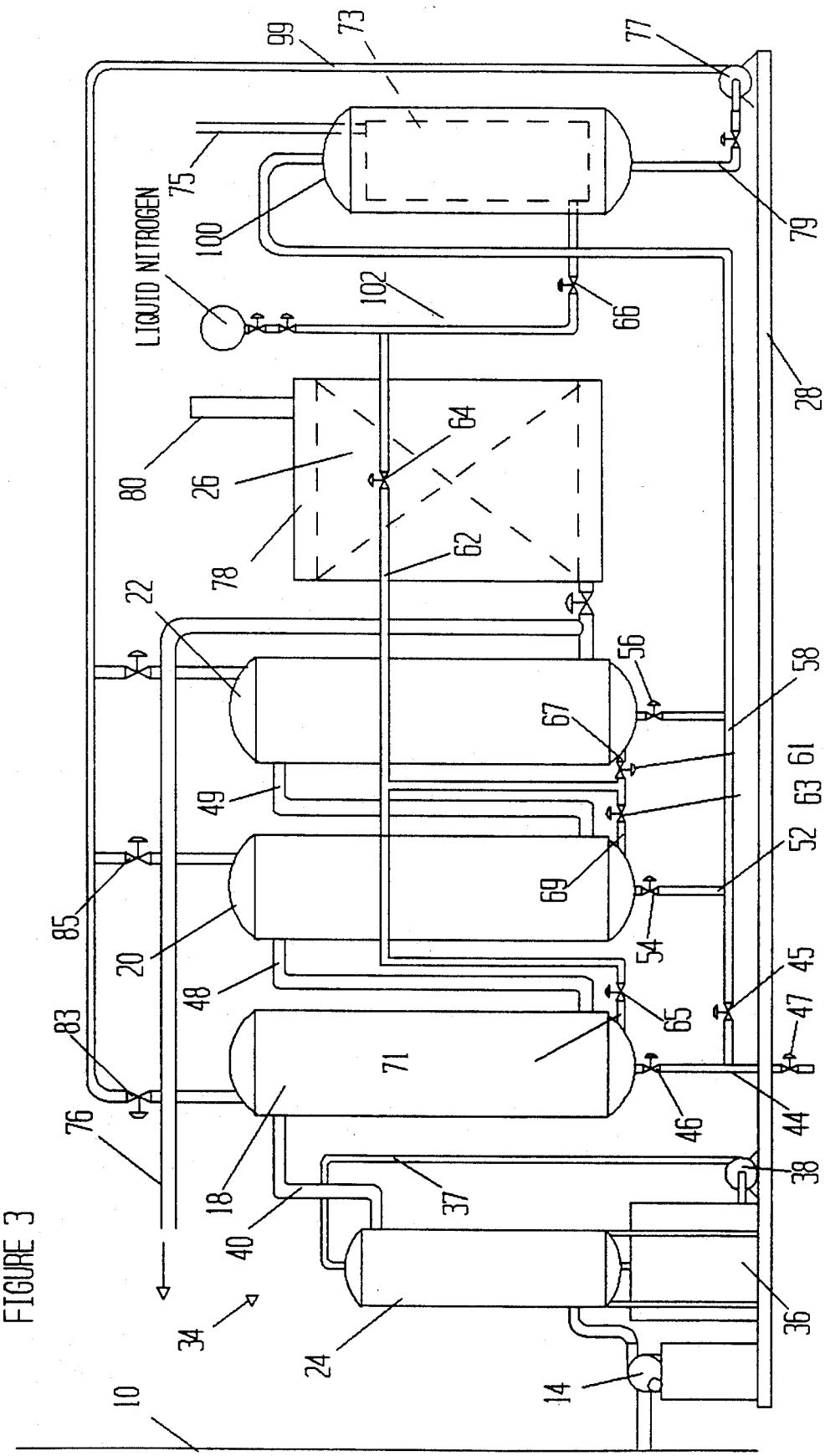
FIG. 3 illustrates an application of the invention using direct contact, cryogenic cooling.

Referring now to FIG. 3, the invention is illustrated for an application using direct cryogenic cooling. In this illustration, many of the components are the same as previously described, and are identified with the same number as for FIG. 2. The caustic wash facilities are the same and include a caustic wash vessel 24, with a caustic recirculation pump 38 and a caustic supply tank 36. The air/vapor mixture is passed to the first stage condenser vessel 18 through line 40. In vessel 18, the air/vapor mixture is mixed with expanded nitrogen gas that is admitted through line 71 at a rate which is controlled by valve 65. Sufficient liquid nitrogen is atomized through expansion nozzles to provide cold nitrogen gas in adequate quantities to cool the air/vapor mixture to a temperature of about 40° F., thereby condensing the moisture in the mixture.

The dehumidified mixture is passed to the second condensation stage within vessel 20, through line 48. In vessel 20, the air/vapor and nitrogen mixture is mixed with cold nitrogen gas that is supplied through line 69 at a rate controlled by valve 63, as described above, which is sufficient to cool the mixture to a temperature of about −40° F. The heavier hydrocarbons are condensed and removed through line 52, and the resulting mixture is passed to vessel 22 through line 49. The condensed hydrocarbons are passed through the condensate header 49 to vessel 100, and a solvent/condensate mixture is recirculated to the vessel 20 by pump 77 to wash this vessel free of solids as a source of solvent/condensate liquid for washing solids from the internal surfaces of the condenser vessel 20 and for providing optimum mass transfer conditions between the vapor and liquid phases within the condenser vessel 20.

Cold nitrogen gas is added to the air/vapor mixture in vessel 22 through line 67 at a rate controlled by valve 61 to cool the mixture to a temperature no greater than −100° F. The condensate from vessel 22 is also passed to the condensate header 49 and to solvent/condensate vessel 100, as previously described with reference to FIG. 1. Thereafter the treated air can be recycled through line 76 to the bulk storage tank 10 (see FIG. 1) as a source of fresh air, or can be vented, preferably after being passed through the adsorbent in vessel 26, as previously described.

Figure 4:
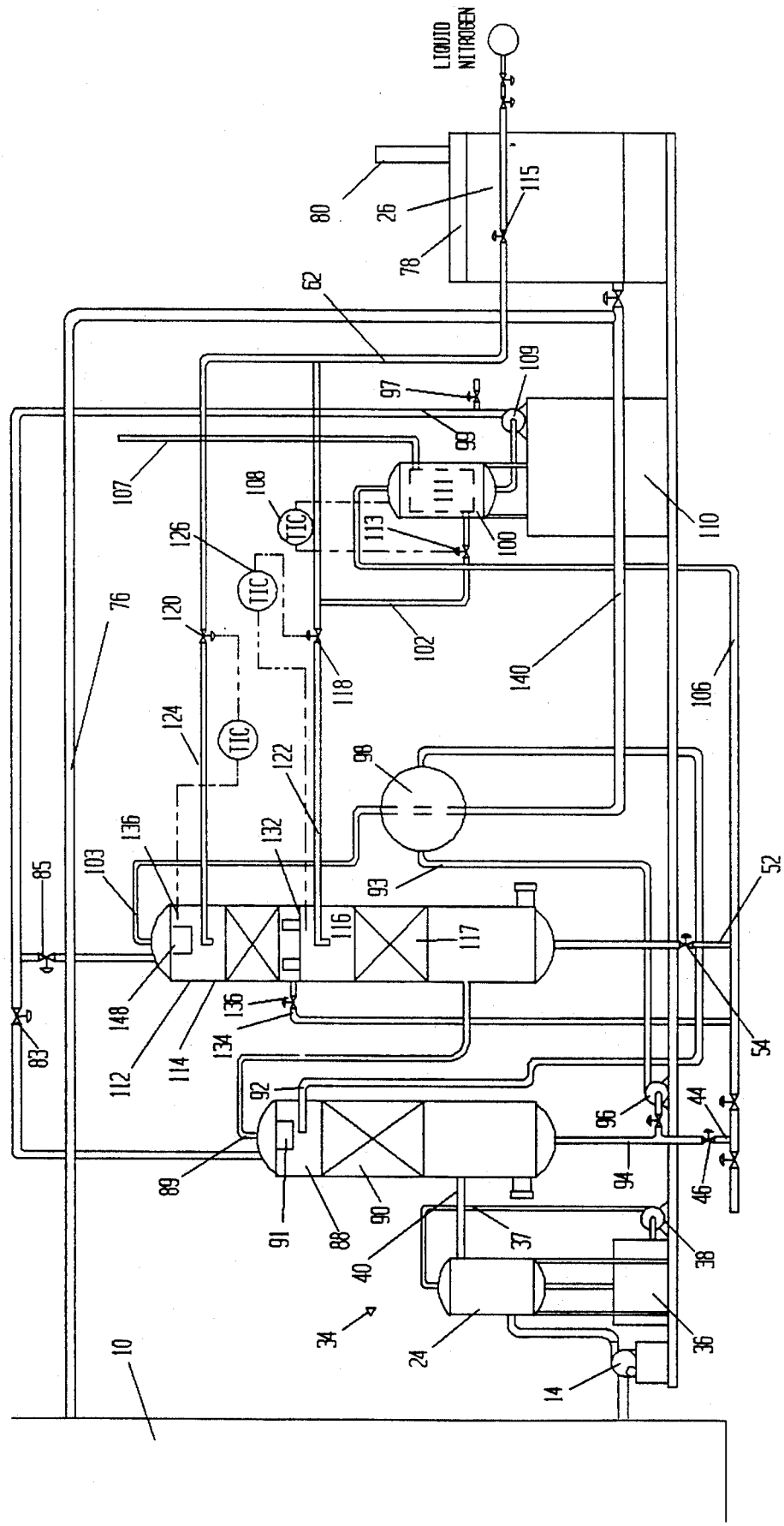
FIG. 4 illustrates another application of the invention using direct contact, cryogenic cooling.

Referring now to FIG. 4, another direct contact cryogenic cooling process is illustrated. In this application, the first, caustic wash stage is the same as previously described, with a caustic wash vessel 24, recirculation pump 38, caustic storage tank 36 and piping 37. This stage is, as before, optional, depending on whether sulfur contaminates are present in the vapor/air mixture. The second stage is a water condensation stage in vessel 88, which is 24 inches in diameter. The vessel contains a bed 90 of Pall rings which is 30 inches in height. The vapor/air mixture passes through the bed 90 countercurrent to water which is applied to the top of the bed with a spray head (not shown) on the end of pipe 92. The water in the vapor/air mixture condenses and is removed through a bottom nozzle 94 and is circulated by pump 96 through a water cooler 98, where it is cooled by indirect heat exchange with the cooled and purified air stream from the succeeding condensation vessel 112. This cooled and purified air stream is introduced into the cooler 98 by conduit 102. The temperature of the water is controlled to slightly less than 40° F. in cooler 98. The cooled water is passed through line 93 to line 92 as a supply of cooling water for vessel 88.

The water which is condensed in vessel 88 is removed through line 44 as controlled by valve 46. The dehumidified vapor/air mixture is withdrawn through nozzle 89 after passing through a demister 91 which is located in the top of vessel 88. The demister can be a woven mesh of plastic or metal which is positioned immediately below the vapor exit nozzle to remove any entrained condensate from the vapor/air stream leaving the vessel 88.

The succeeding stage of the treatment facilities 34 comprises a fractional condensation tower 112. This tower has two condensation stages 114 and 116. Each stage has a packed bed 117 of Pall rings and is 48″ inches in height. Liquid nitrogen from supply line 62 is expanded and introduced into each stage through control valves 118 and 120 which are in supply lines 122 and 124. The temperature controller 126 for valve 118 has a temperature sensor 130 in the first condensation stage 116 with a control temperature of at least −40° F.

The heavier hydrocarbon fraction in the vapor/air mixture is condensed in stage 116 and is removed from the bottom of tower 112 through line 52 at a rate controlled by valve 54. The remaining hydrocarbons are condensed in stage 114 and collect on liquid draw off tray 132 through line 134 at a rate controlled by valve 136. Nitrogen is introduced into stage 114 through line 124 at a rate sufficient to maintain the temperature, as detected by temperature sensor 136, at $-100°$ F., or slightly below $-100°$ F. The tower 112 also has a demister 148, which removes any entrained hydrocarbon condensate from the air stream leaving the tower.

As previously mentioned, the purified air stream is passed to the water cooler 98 through line 103, and exits the water cooler through line 140. The purified air can be passed to a final stage of purification in adsorption vessel 26, where it contacts a packed bed of adsorbent 78, preferably activated carbon, prior to being discharged to the atmosphere through stack 80. Alternatively, some or all of the purified air can be recycled to tank 10 through line 76 as a source of a flushing gas which is passed through the tank and treatment facilities.

The condensate from vessel 112 is discharged into the condensate header 106 which discharges into the upper portion of the solvent/condensate vessel 100. This vessel contains an indirect heat exchanger 111 which is cooled, on its tube side, with expanded liquid nitrogen from line 102 and control valve 113. The rate of supply of nitrogen to the cooler 111 is controlled by temperature controller 108 to maintain the internal temperature of vessel 100 at or slightly less than minus 40 degrees F., preferably at or less than minus 60 degrees F.

The solvent/condensate mixture which collects in vessel 100 is removed therefrom through line 110 to pump 109 from where it can be recirculated to the condenser vessel 112 at a rate controlled by valve 85. Net production of condensate can be discharged to storage through valve 97.

The solvent which is used in the treatment is a solvent for hydrocarbons and can be any low boiling point solvent such as a hydrocarbon, e.g., hexane, pentane, isopentane, etc. Also useful are oxygenated solvents such as esters, e.g., ethyl acetate, isopropyl acetate, etc.; alcohols such as n- and isopropanol, hexanol, amyl alcohol, etc.; and ethers such as diethyl ether, propyl ethyl ether, etc. Preferably, the solvent is one which is compatible as an additive in gasoline, to avoid the necessity to remove the solvent from the condensate product by fractionation or other additional treatment.

The solvent functions as a wash liquid in the condensation states and removes any solids which may be formed in the condensation stages, and as an aid to increase the mass transfer between the vapor and liquid phases in the condensation vessels. For this purpose, the solvent is circulated to the upper portion of the condensation vessel 112 for downward flow through the vessel, continuously washing the surfaces of the packing in beds 117, thereby insuring that the packed beds do not become clogged with solidified hydrocarbons.

As the treatment progresses, the solvent becomes increasingly concentrated in the condensate which is recovered from the air/vapor mixture. Fresh quantities of solvent can be added during the treatment, if desired, however, it is usually not necessary to add fresh solvent.

Referring now to FIG. 5, the process which is illustrated is a modification of that shown in FIG. 4 to provide for indirect and direct cooling of the vapor/air mixture. In some applications, the volume of nitrogen gas which is mixed with the vapor/air mixture can be so great that it overloads the condensation equipment, reducing through-put and efficiency of the system. In such applications, it is preferred to use indirect heat exchange for one or more stages of condensation, preferably for the first hydrocarbon condensation stage. Such a system is shown in FIG. 5 where the vapor/air mixture which is discharged from the water condenser vessel 88 is passed by vapor line 89 to the inlet of vessel 150. Vessel 150 is provided with an internal heat exchanger 152 such as those previously described with reference to FIG. 2, and cooling nitrogen is supplied to the tubes of the exchanger 152 through 168 from the nitrogen supply line 122, at a rate controlled by valve 158. This valve can, if desired, be an automatically controlled valve if provided with a temperature controller such as 126 that would respond to the internal temperature of the vessel 150. The nitrogen can be exhausted to the atmosphere thorough line 160 after passage through the heat exchanger 152. As with the other condensation stages, previously described with reference to FIG. 4, the internal surfaces of condenser vessel 150 can be washed with the solvent/condensate from vessel 100 supplied thereto through line 166 at a rate controlled by valve 168. The condensate and solvent liquid which collects in the bottom of vessel 150 can be returned to vessel 100 through line 162 at a rate controlled by valve 164, and the air/vapor mixture is passed from condenser vessel 150 to the condensation vessel 112 through line 154.

The invention will now be illustrated by the following example which will serve to demonstrate results obtainable thereby.

EXAMPLE

A floating roof gasoline storage tank which is 110 feet in diameter is to be cleaned. The treatment facilities illustrated in FIG. 4 are connected to a bottom nozzle of the tank. The floating roof of the tank is lowered to a level of 6 feet above the bottom when the tank is drained of all liquid, thereby providing a volume within the tank of about 57,000 cubic feet.

Fresh air is introduced into the upper portion of the tank and the tank contents are evacuated and passed to the treatment facility of this invention at a flow rate of 1,000 to 5,000 cubic feet per minute. The air/vapor mixture within the tank initially contains approximately 35 percent hydrocarbons. When there are volatile sulfur compounds in the air/vapor mixture, the mixture is passed to the caustic treatment facility and a 30 weight percent aqueous sodium hydroxide solution is circulated at a flow rate of 50 gallons per minute into contact with the air/vapor mixture. The contacting is performed within a vessel containing four feet of 2 inch Tellerette inert packing.

The air/vapor mixture is passed through conduits 18 inches in diameter to three successive stages of the condenser train. During the operation of the system, the air in the bulk storage tank is flushed with a minimum of 2.5 volumes of fresh air, and the treatment extends over a period of 6 to 20 hours.

The system is initially charged with 55 gallons of isopropanol in the solvent/condensate vessel 100, and the solvent/condensate mixture is circulated to the condensation vessel 112 at a rate from 3 to about 5 gallons per minute.

Liquid nitrogen is supplied to the condenser train at a flow rate of about 150 to 300 gallons per hour, which is sufficient to maintain an air temperature in the final stage of −100 degrees F. The operation is conducted substantially as previously described for FIG. 4. The air which is exhausted to the atmosphere is passed through a bed of activated carbon having a depth of two to three feet in an absorber vessel 6 feet in diameter and 10 long.

The treatment is effective to recover over 90% of the hydrocarbons contained within the air vapor mixture of the tank. The total recovery of gasoline from the treatment is 6000 gallons of gasoline. The total cost for the liquid nitrogen is $3500.00, and the value of the recovered gasoline has a market value of $1.00 per gallon. A substantial cost of the liquid nitrogen is more than offset by the value of the recovered hydrocarbons.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A portable condensation apparatus for the fractional condensation of volatile hydrocarbons form a large volume of hydrocarbon vapors and air mixture within a confined chamber which comprises:
   a. a first condensation stage including a vessel with an inlet nozzle for introduction of said mixture, an inlet nozzle for the introduction of a cooling medium, liquid collection means, an outlet nozzle for the withdrawal of condensed liquid from said vessel, and an outlet nozzle for the withdrawal of said mixture after passage through said vessel;
   b. at least one succeeding condensation stage including means to introduce a cooling medium into said succeeding stage for direct mixing and contact with said mixture therein, liquid collection means at the bottom said succeeding condensation stage with liquid withdrawal means for the removal of condensed liquid from said succeeding condensation stage, and an outlet nozzle for the withdrawal of said mixture after passage through said succeeding stage;
   c. means to supply liquid nitrogen as the cooling medium to said condensations stages for direct mixing and contact with said mixture therein;
   d. at least one blower with means to connect the intake of said blower to said confined chamber and its discharge connected to circulate said vapor and air mixture through said condensation apparatus;
   e. means to direct the discharge from the last of said condensation stages to an inlet to said confined chamber to thereby provide recirculation of air through said confined chamber; and
   f. an adsorption vessel containing an adsorbent and means to direct a stream of purified air form the last of said condensation stages to said adsorption vessel, and means to discharge air to the atmosphere after passage through said adsorption vessel.

2. The condensation apparatus of claim 1 wherein said confined chamber is a petroleum storage tank.

3. The condensation apparatus of claim 1 wherein said condensation stages include beds of inert solid packing.

4. The condensation apparatus of claim 1 including two succeeding stages of fractional condensation contained within a single vessel and including a liquid collection stage at an intermediate height in said vessel with a liquid condensate draw off nozzle connected thereto to withdraw a third liquid condensate stream.

5. The condensation apparatus of claim 4 including piping interconnecting said heat exchangers wherein said nitrogen can be passed serially through the heat exchangers of said condensation stages.

6. The condensation apparatus of claim 4 including piping connecting the nitrogen outlet from said heat exchangers to said purified air stream, wherein nitrogen which is passed through said heat exchangers as a source of cooling medium can be mixed with said purified air stream and including means to pass the resulting nitrogen and air mixture to said confined chamber.

7. The condensation apparatus of claim 1 including a solvent/condensate vessel to collect condensate, means connecting the outlet nozzles for withdrawal of condensed liquid from at least one of said first and succeeding condensation stages to said solvent/condensate collection vessel, and recirculating means including a pump to recirculate the contents of said solvent/condensate collection vessel as a wash liquid in said one of said condensing stages.

8. The condensation apparatus of claim 7 including cooling means within said solvent/condensate vessel and means to supply a cooling fluid thereto.

9. A portable condensation apparatus for the fractional condensation of volatile hydrocarbons form a large volume of hydrocarbon vapors and air mixture within a confined chamber which comprises:
   a. a first condensation stage including a vessel having a heat exchanger having first and second sides, with an inlet nozzle for introduction of said mixture on one side of said heat exchanger, an inlet nozzle for the introduction of a cooling medium into said vessel on the other side of said heat exchanger, liquid collection means, an outlet nozzle for the withdrawal of condensed liquid from said vessel, and an outlet nozzle for the withdrawal of said mixture after passage through said vessel and an outlet nozzle for withdrawal of nitrogen from said vessel;
   b. at least one succeeding condensation stage including a heat exchanger having first and second sides, with means to introduce said mixture into said condensation stage on one side of said heat exchanger and means to introduce a cooling medium into said succeeding stage on the opposite side of said heat exchanger, liquid collection means at the bottom said succeeding condensation stage with liquid withdrawal means for the removal of condensed liquid from said succeeding condensation stage, and an outlet nozzle for the withdrawal of said mixture after passage through said succeeding stage;
   c. means to supply liquid nitrogen as the cooling medium to said condensation stages and means to withdraw nitrogen from each of said stages;
   d. at least one blower with means to connect the intake of said blower to said confined chamber and its discharge connected to circulate said vapor and air mixture through said condensation apparatus;
   e. means to direct the discharge from the last of said condensation stages to an inlet to said confined chamber to thereby provide recirculation of air through said confined chamber; and f. an adsorption vessel containing an adsorbent and means to direct a stream of purified air form the last of said condensation stages to said adsorption vessel, and means to discharge air to the atmosphere after passage through said adsorption vessel.

10. The condensation apparatus of claim 9 including means to circulate condensate from said first stage through a cooler containing a heat exchanger, means to supply said nitrogen to said heat exchanger for indirect heat exchange with condensate and means to recycle cooled condensate from said cooler to said first stage as the source of cooling medium therein.

11. The condensation apparatus of claim 9 including two succeeding fractional condensation stages, each contained within a separate vessel and each provided with a heat exchanger with means to supply nitrogen to each heat exchanger as a source of cooling medium therein.

* * * * *